United States Patent
Kuang et al.

(10) Patent No.: US 11,329,797 B2
(45) Date of Patent: May 10, 2022

(54) METHOD AND SYSTEM FOR SECURE PHASE-ENCODED DIGITAL COMMUNICATION OVER OPTICAL CHANNELS

(71) Applicant: Quantropi Inc., Ottawa (CA)

(72) Inventors: Randy Kuang, Ottawa (CA); Nicolas Bettenburg, Ottawa (CA); James Nguyen, Ottawa (CA)

(73) Assignee: Quantropi Inc., Ottawa (CA)

( * ) Notice: Subject to any disclaimer, the term of this patent is extended or adjusted under 35 U.S.C. 154(b) by 167 days.

(21) Appl. No.: 16/879,061

(22) Filed: May 20, 2020

(65) Prior Publication Data

US 2021/0266142 A1   Aug. 26, 2021

Related U.S. Application Data (60) Provisional application No. 63/006,185, filed on Apr. 7, 2020, provisional application No. 62/981,495, filed on Feb. 25, 2020.

(51) Int. Cl.
*H04L 9/06* (2006.01)
*H04L 29/06* (2006.01)
(Continued)

(52) U.S. Cl.
CPC .............. *H04L 9/06* (2013.01); *H04B 10/556* (2013.01); *H04B 10/613* (2013.01); *H04L 63/18* (2013.01)

(58) Field of Classification Search
CPC ....... H04L 9/06; H04L 63/18; H04L 63/0428; H04L 63/061; H04B 10/556; H04B 10/613; H04B 10/70; H04B 10/85
See application file for complete search history.

(56) References Cited

U.S. PATENT DOCUMENTS 6,507,449 B1 * 1/2003 Sutardja .............. G11B 5/59611
6,937,273 B1   8/2005 Loui
(Continued)

FOREIGN PATENT DOCUMENTS

CA    2 638 134 A1   1/2010
CN   101610510 A    12/2009
(Continued)

OTHER PUBLICATIONS

"Phase Demodulation via Hilbert Transform: Hands-On"—Mathuranathan Viswanathan, Gaussian Waves, Jun. 6, 2017 https://www.gaussianwaves.com/2017/06/phase-demodulation-using-hilbert-transform-application-of-analytic-signal/ (Year: 2017).*
(Continued)

*Primary Examiner* — Randy A Scott
(74) *Attorney, Agent, or Firm* — Wolf, Greenfield & Sacks, P.C.

(57) ABSTRACT

A digital communication method over an optical channel. Bob modulates a coherent optical signal with a random envelope phase $\varphi r$, known to him and not to Alice, and transmits the modulated coherent optical signal (envelope) over the optical channel to Alice. Alice further modulates the envelope with a key phase $\varphi k$, based on a secret key and a selected modulation scheme, to create a cipher envelope, and sends the cipher envelope towards Bob along the optical channel. Bob then demodulates a received version of the cipher envelope by removing the random envelope phase $\varphi r$ (known to Bob) and then measures the phase of the resulting demodulated coherent optical signal with the coherent detector to extract, to within a certain margin of error, the key phase $\varphi k$, from which Alice's secret key can be decoded. Bob then uses the secret key for encrypting messages sent to Alice over any digital network.

22 Claims, 8 Drawing Sheets

(51) Int. Cl.
*H04B 10/61* (2013.01)
*H04B 10/556* (2013.01)
*H04L 29/08* (2006.01)

(56) References Cited

U.S. PATENT DOCUMENTS

| | | | |
|---|---|---|---|
| 7,019,882 B1* | 3/2006 | Wilson | H04B 10/50 359/237 |
| 8,169,887 B2 | 5/2012 | Tsai | |
| 10,271,088 B2 | 4/2019 | Ellis | |
| 2002/0023220 A1 | 2/2002 | Kaplan | |
| 2002/0090203 A1 | 7/2002 | Mankovitz | |
| 2005/0190922 A1 | 9/2005 | LaGasse | |
| 2006/0031737 A1 | 2/2006 | Chugg et al. | |
| 2006/0088157 A1 | 4/2006 | Fujii | |
| 2007/0076888 A1* | 4/2007 | Kuang | H04L 9/0858 380/278 |
| 2009/0034737 A1 | 2/2009 | Trifonov | |
| 2009/0185689 A1 | 7/2009 | Beal | |
| 2010/0005132 A1 | 1/2010 | Choi et al. | |
| 2010/0239092 A1 | 9/2010 | Kuang | |
| 2014/0281367 A1 | 9/2014 | Johnson et al. | |
| 2015/0089223 A1 | 3/2015 | Tasher et al. | |
| 2015/0350655 A1 | 12/2015 | Huang | |
| 2017/0353302 A1 | 12/2017 | Fernandez et al. | |
| 2018/0058590 A1* | 3/2018 | Kubota | F16K 27/02 |
| 2018/0102853 A1* | 4/2018 | Dolgin | G02B 5/28 |
| 2019/0199523 A1 | 6/2019 | Alleaume et al. | |

FOREIGN PATENT DOCUMENTS

| | | |
|---|---|---|
| CN | 101610510 B | 6/2012 |
| WO | 2019/079890 A1 | 5/2019 |

OTHER PUBLICATIONS

"Digital Phase Modulation: A Review of Basic Concepts"—James E. Gilley, Transcrypt International, Inc., Aug. 7, 2003 https://www.efjohnson.com/resources/dyn/files/75832z342fce97/_fn/Digital_Phase_Modulation.pdf (Year: 2003).*
International Search Report and Written Opinion for International Application No. PCT/CA2018/051339 dated Jan. 31, 2019.
International Search Report and Written Opinion for International Application No. PCT/CA2019/050093 dated May 1, 2019.
Cheng et al., Securing the Internet of Things in a Quantum World. Internet of Things. IEEE Communications Magazine. Feb. 2017. 5 pages. DOI: 10.1109/MCOM.2017.1600522CM.
Martinelli, Encryption Algorithms and Permutation Matrices. Haiku Laboratories. http://www.haikulabs.com/encrmat4.htm Jun. 2003. Last accessed Oct. 24, 2017. 4 pages.
Smithey et al., Measurement of Numner-Phase Uncertainty Relations of Optical Fields. Physical Review A. 1993;48(4):3159-3167. doi:10.1103/physreva.48.3159.
PCT/CA2015/051339, dated Jan. 31, 2019, International Search Report and Written Opinion.
PCT/CA2019/050093, dated May 1, 2019, International Search Report and Written Opinion.
International Search Report and Written Opinion dated Jun. 1, 2021 in connection with International Application No. PCT/CA2021/050212.

* cited by examiner

| Indx | φ_REF[indx] |
|---|---|
| 0 | 16*11.25 |
| 1 | 6*11.25 |
| 2 | 11*11.25 |
| 3 | 5*11.25 |
| 4 | 24*11.25 |
| 5 | 15*11.25 |
| 6 | 2*11.25 |
| etc. | etc. |

METHOD AND SYSTEM FOR SECURE PHASE-ENCODED DIGITAL COMMUNICATION OVER OPTICAL CHANNELS

CROSS-REFERENCE TO RELATED APPLICATIONS

The present application claims the benefit of U.S. provisional patent application Ser. No. 62/981,495, filed Feb. 25, 2020, and U.S. provisional patent application Ser. No. 63/006,185, filed Apr. 7, 2020, both of which are hereby incorporated by reference herein.

FIELD

The present application relates generally to communication over optical channels and, in particular, to a method and system for secure phase-encoded digital communication over such channels.

BACKGROUND

There is an ever-growing need for security in digital communications systems. One known security paradigm is a key-based encryption scheme. A sender of a message encrypts a message using a key, and the encrypted message is sent to the recipient where it is decrypted using the same key or a complementary key. Assuming that the key or keys can be safely distributed to the sender and the recipient, it is possible to make such a key-based encryption scheme arbitrarily secure. The security weakness therefore lies not in the transmission of the message encrypted using the keys, but in the manner in which the keys themselves are distributed to the sender and recipient.

One technique that has attracted some interest and research over the past few decades is known as quantum key distribution (QKD), whereby faint optical pulses are used to exchange information between sender and recipient, such information being encoded to convey the key (or keys). An attempt at accessing the pulses by an unauthorized party destroys the data carried by the pulses, which can be detected by the sender or the recipient, thereby eliciting a security response. However, this system requires specialized optical transmission and reception equipment, as well as a dedicated, precisely engineered optical channel, which makes the system prohibitively expensive and of limited use outside a controlled environment. Moreover, the highest data rates that can be currently achieved using commercial QKD techniques are still comparatively low (on the order of kilobits per second).

It would therefore be of interest to the industry to provide a highly secure technique for distributing digital information, such as encryption keys, over a standard optical channel and at adequate data rates, while benefiting from extremely high security heretofore achieved only by quantum key distribution techniques.

BRIEF SUMMARY

According to a first broad aspect, there is provided a method, which comprises: generating a coherent optical signal; generating sender-side data; changing a phase of the coherent optical signal in accordance with the sender-side data; sending the phase-changed coherent optical signal over an optical channel; obtaining a received coherent optical signal over the optical channel; and detecting data that is phase-encoded in the received coherent optical signal, wherein the detecting includes compensating for said changing.

According to another broad aspect, there is provided an apparatus, which comprises: an optical device configured for generating a coherent optical signal; a data generator configured for generating sender-side data; a phase modulator operatively coupled to the optical device and the data generator, configured for changing a phase of the coherent optical signal in accordance with the sender-side data; an interface operatively coupled for the phase modulator, configured for sending the phase-changed coherent optical signal over an optical channel and for obtaining a received coherent optical signal over the optical channel; and demodulation and detection hardware operatively coupled to the interface and to the data generator, configured for detecting data that is phase-encoded in the received coherent optical signal, wherein the detecting includes compensating for said changing.

According to another broad aspect, there is provided a non-tangible computer-readable storage medium, comprising computer-readable instructions which, when carried out by a computing device, cause the computing device to carry out a method that comprises generating sender-side data, providing the sender-side data to a phase modulator for changing a phase of a coherent optical signal in accordance with the sender-side data, and detecting data that is phase-encoded in the received coherent optical signal, wherein the detecting includes compensating for said changing.

According to another broad aspect, there is provided a method, which comprises: receiving a coherent optical signal from a sender over an optical channel; generating recipient-side data; changing a phase of the received coherent optical signal in accordance with the recipient-side data; returning the phase-changed received coherent optical signal towards the sender over the optical channel.

According to another broad aspect, there is provided an apparatus, which comprises: an optical interface configured for receiving a coherent optical signal from a sender over an optical channel; a data generator configured for generating recipient-side data; a phase modulator configured for changing a phase of the received coherent optical signal in accordance with the recipient-side data; the optical interface configured for returning the phase-changed received coherent optical signal towards the sender over the optical channel.

According to another broad aspect, there is provided a method, which comprises: receiving from a sender along an optical channel an optical envelope that is phase modulated with sender-side data; phase modulating recipient-side data onto the envelope without detecting the envelope; and returning the envelope to the sender along the optical channel after the phase modulating.

According to another broad aspect, there is provided an apparatus, which comprises: an optical interface configured for receiving from a sender along an optical channel an optical envelope that is phase modulated with sender-side data; wherein a phase modulator configured for phase modulating recipient-side data onto the envelope without detecting the envelope; wherein the optical interface is further configured for returning the envelope to the sender along the optical channel after the phase modulating.

According to another broad aspect, there is provided a communication system which comprises a first communication apparatus and a second communication apparatus operatively coupled to the first communication apparatus. The first communication apparatus is configured for causing a change to a phase of a coherent optical signal by modulating the coherent optical signal in accordance with first data, thereby to create an envelope; and sending the envelope to the second communication device over an optical channel. The second communication apparatus is configured for receiving the envelope and modulating a digital key into a phase of the envelope to create a cipher envelope; and sending the cipher envelope to the first communication apparatus over the optical channel. The first communication apparatus is further configured for: receiving the cipher envelope; compensating for said change by phase modulating the cipher envelope in accordance with said first data; and detecting the digital key based on coherent detection of the phase modulated cipher envelope.

According to another broad aspect, there is provided a method for optical signal tapping, which comprises: tapping a first optical signal traveling over an optical channel from a first entity to a second entity, the first optical signal carrying a phase-encoded coherent optical signal; tapping a second optical signal traveling over the optical channel from the second entity to the first entity, the second optical signal carrying a twice phase-encoded coherent optical signal, the twice-encoded coherent optical signal carrying data sent by the second entity; using at least one detector to determine a phase related to the first tapped optical signal and a phase related to the second tapped optical signal; comparing the phases to obtain a resultant phase; and attempting to decode the data from the resultant phase.

According to another broad aspect, there is provided a method for optical signal tapping, which comprises: tapping a first optical signal traveling over an optical channel from a first entity to a second entity to obtain a first tapped optical signal; tapping a second optical signal traveling over the optical channel from the second entity to the first entity to obtain a second tapped optical signal; using at least one local oscillator to determine a first relative phase of the first tapped optical signal and a second relative phase of the second tapped optical signal; comparing the first relative phase and the second relative phase to obtain a third phase; and attempting to decode from the third phase data sent by the second entity.

According to another broad aspect, there is provided a method, which comprises: phase-modulating a coherent optical with a first phase component, thereby to produce a second coherent optical signal; releasing the second optical signal onto an optical channel; phase-modulating a version of the second optical signal received over the optical channel to remove the first phase component; and detecting a second phase component present in the received version of the second optical signal and absent from the second optical signal that was released onto the optical channel.

DETAILED DESCRIPTION

Figure 1:
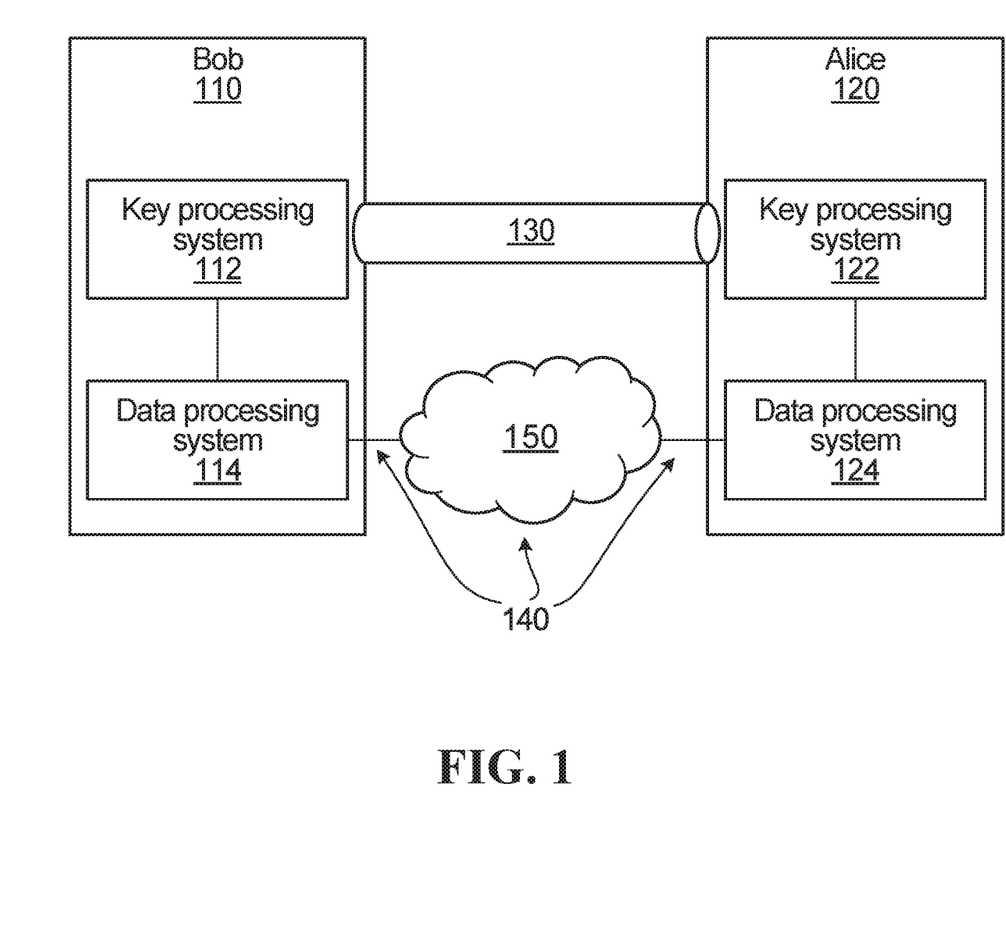
FIG. 1 is a block diagram showing a digital communication system involving a sender and a recipient, in accordance with a non-limiting embodiment.

With reference to FIG. 1, there is shown a communication system comprising a first apparatus 110 and a second apparatus 120 in communication with each other over a key distribution channel 130 and a data channel 140. The key distribution channel may be a physical channel extending between the first and second apparatuses. The key distribution channel 130 can include an optical medium such as one or more optical fibers. The data channel 140 may be a virtual channel that may include one or more optical or non-optical segments, such as a coaxial, Ethernet or RF wireless segments. The data channel may traverse one or more data networks 150, including private data networks and the internet. In some embodiments, the data channel 140 may be share an optical medium with the key distribution channel.

The first and second apparatuses are communication peers, and the first apparatus may be nicknamed "Bob" whereas the second apparatus may be nicknamed "Alice". Most of the present disclosure will consider the case in which Bob wishes to send a (digital) message to Alice by encrypting the message using a secret digital key sent from Alice to Bob. Accordingly, Bob will be referred to as a "sender" and Alice will be referred to as a "recipient". However, this nomenclature is chosen merely for convenience, and it is to be understood that each of Alice and Bob can be, and in fact are, both a transmitter and a receiver of information. For example, while the present disclosure mainly focuses on Bob's retrieval of a secret key from Alice so as to send an eventual message to Alice using Alice's secret key, an analogous description would apply to Alice's retrieval of a secret key from Bob so as to send an eventual message to Bob using Bob's secret key.

There are three main steps to allow Bob to securely send information to Alice:

Step 1: Bob retrieves Alice's secret key over the key distribution channel. Alice's secret key is not intended for public consumption; it must be securely delivered only to Bob. As such, Alice's secret key may be sent to Bob in a manner somewhat analogous to a "pubic" key in PKI terminology, whereby Bob generates a pair of "public" and "private" keys, sends the "public" key to Alice for her to encrypt her secret key and retains a related "private" key for later use to decrypt the upcoming cipher (conveying the secret key) from Alice. To allow retrieval of Alice's secret key in a secure manner, Bob implements a sender-side key processing system 112 and Alice implements a recipient-side key processing system 122, as will be described later on in greater detail.

Step 2: Bob encrypts a message with Alice's secret key and sends the encrypted message to Alice over the data channel. To this end, Bob implements a sender-side data processing system 114 operatively coupled to the sender-side key processing system 112, and Alice implements a recipient-side data processing system 124 operatively coupled to the recipient-side key processing system 122.

Step 3: Alice decrypts the encrypted message using Alice's related key (referred to above as being analogous to a "private" key in PKI terminology). Decryption is performed by Alice's recipient-side data processing system 124. In asymmetric encryption schemes, the keys used for encryption by Bob and for decryption by Alice are different, whereas in symmetric encryption schemes, the two keys are the same.

Of course, the aforementioned steps can be carried out for communicating a message in the opposite direction of communication, whereby ultimately Alice sends Bob an encrypted message using a secret key generated by Bob and retrieved by Alice using their respective key processing systems 112, 122.

The remainder of the present disclosure focuses mainly on Step 1 above, whereby Bob's sender-side key processing system 112 cooperates with Alice's recipient-side key processing system 122 to allow Bob to retrieve a secret key generated and sent by Alice.

Figure 2:
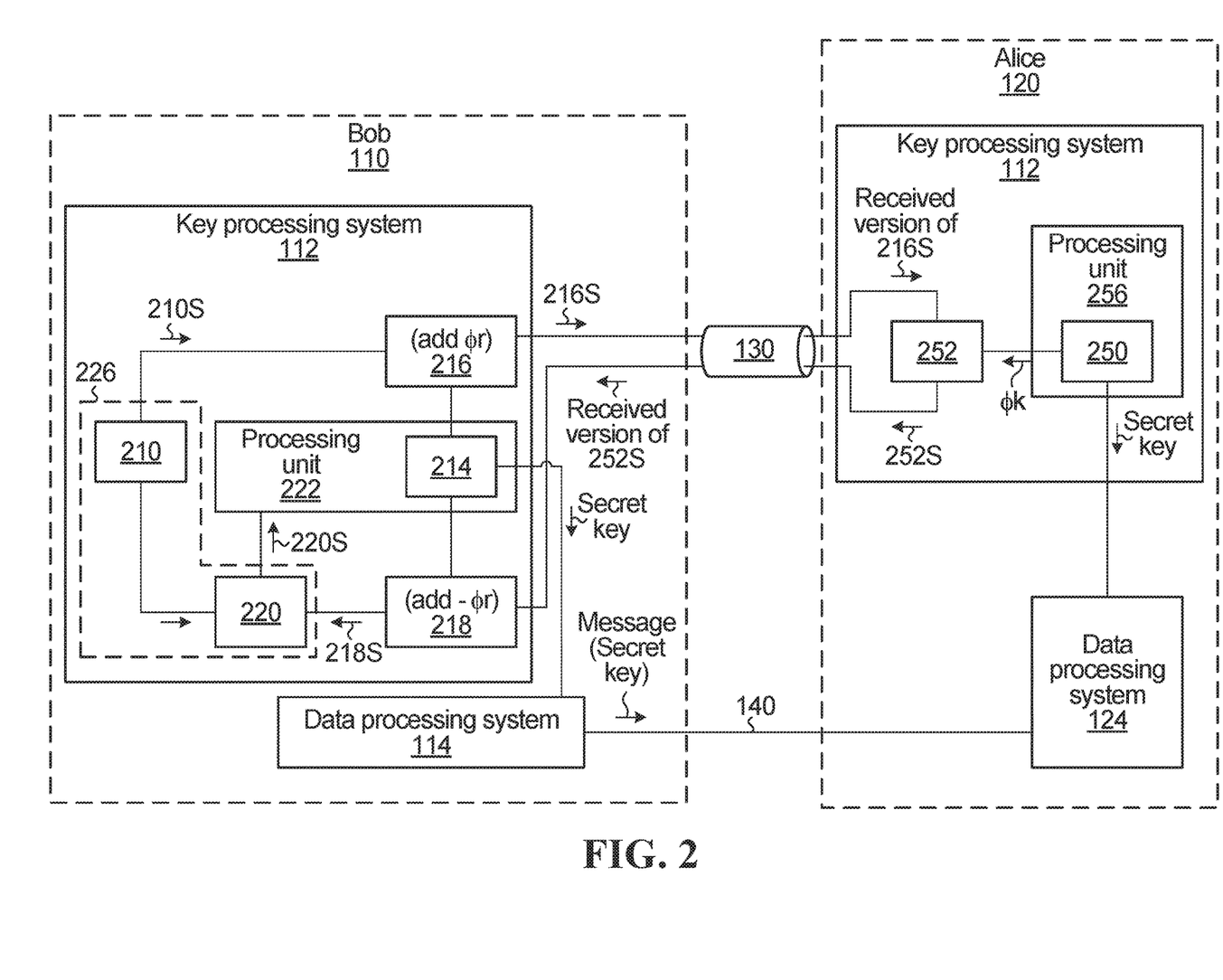
FIG. 2 is a block diagram showing components of a sender-side key processing system and a recipient-side key processing system, in accordance with a non-limiting embodiment.

Accordingly, with reference to FIG. 2, Bob's key processing system 112 comprises a device 210 for generating a coherent optical signal 210S. A suitable non-limiting example of the device 210 includes a component configured to oscillate coherently at an oscillation frequency, such as a laser diode. The coherent optical signal 210S includes a series of coherent laser pulses, each characterized by a Glauber state associated with a phase. Glauber states are described in more detail later on in this document.

In addition, Bob's key processing system 112 comprises a randomizing module, which comprises a data generator 214 and two phase modulators 216 and 218. The data generator 214 generates sender-side data which is fed to both phase modulators 216, 218, although a delay is applied to the sender-side data being provided to phase modulator 218. A suitable non-limiting example of the data generator 214 is a random number generator or pseudo-random number generator, which may be part of a processing unit 222. The data generator 214 conveys the sender-side data as a voltage to drive phase modulator 216, which is configured to change the phase of the coherent optical signal 210S by a corresponding amount φr (the "random envelope phase"). This results in a phase-changed coherent optical signal, denoted 216S, also referred to as an "envelope" occupying a certain Glauber state. The phase modulator 216 is configured to transmit the envelope 216S over the key distribution channel 130 towards Alice. This may be done via an optical interface.

Turning now to Alice's key processing system 122, it comprises a key generator 250 and a key modulator 252. The key generator 250, which may be part of a processing unit 256, is configured to generate a secret key. The secret key may be provided to Alice's data processing system 124, which uses the secret key to eventually decrypt messages sent by Bob over the data channel 140. For example, the secret key may be used directly to decrypt such an encrypted message, or the secret key may be paired with a local key (not shown) used for such decryption by the data processing system 124.

The key generator 250 is configured to convert one or more bits of the secret key into a key phase φk, which is fed to the key modulator 252. In a non-limiting embodiment, the key modulator 252 is implemented as a phase modulator. The key modulator 252 is operatively coupled to an optical interface, which is configured to receive a received version of the envelope 216S. The key modulator 252 is configured to change the phase of the received version of the envelope 216S by the amount of the key phase φk supplied by the key generator 250, resulting in a coherent optical signal 252S. The coherent optical signal 252S, which can be referred to as a cipher envelope, can be thought of as a phase-encoded version of the envelope 216S or a twice-phase-encoded version of the coherent optical signal 210S. The cipher envelope 252S is in a different Glauber state than the envelope 216S. It is noted that Alice does not need to know the random envelope phase φr (or the Glauber state of the envelope 216) when phase-encoding the key phase φk into the cipher envelope 252S, and Alice does not detect or attempt to detect the received envelope 216S.

Alice's key modulator 252 is configured to transmit the cipher envelope 252S over the key distribution channel 130 back towards Bob. This may be done via an optical interface. It is noted that after undergoing a phase change at Alice, the cipher envelope 252S returned towards Bob (and received via an optical interface) carries data that is phase-encoded in the key phase φk which at first appears unknown to Bob. However, because Bob knows the random envelope phase φr, Bob can compensate for this in order to extract φk.

To this end, Bob's data generator 214 provides the same sender-side data that was used by phase modulator 216 (to produce the envelope 216S) as a voltage to drive phase modulator 218, but in a delayed fashion, so as to account for the round-trip transmission delay on the key distribution channel 130. This effectively produces a coherent optical signal 218S which has been rotated by −φr, thereby removing the random envelope phase that had been added by phase modulator 216. The resulting coherent optical signal 218S is supplied to a detection unit 220, which attempts to detect and extract the key phase φk that was added by Alice.

Bob's detection unit 220 can be implemented as a coherent optical demodulator/detector that employs the same modulation scheme as is used by Alice's key modulator 252. The detection unit 220 may comprise a local oscillator. The detection unit 220 and the device 210 (e.g., laser diode) can be implemented as an optical transceiver 226. As such, the randomizing module can be implemented as an independent unit operationally coupled to the optical transceiver 226. The laser diode and the local oscillator oscillate at the same optical frequency and, in some cases, the laser diode and the local oscillator can utilize the same laser source, although this is not a requirement.

Considering now the phase of the envelope 216S generated by Bob (after passing through phase modulator 216), it will be the sum of some initial unknown phase φi and the random envelope phase φr added by phase modulator 216, whereas the phase of the cipher envelope 252S as it returns towards Bob will have a phase that further incorporates the phase key φk added by Alice's key modulator 252 and is also affected by the round-trip phase shift φp accumulated by having traveled along the key distribution channel 130 from Bob to Alice and back to Bob (including the impact from its environment). As such, the version of the cipher envelope 252S processed by Bob has a phase that can be represented as the sum of these four components: φi+φr+φk+φp.

Bob's phase modulator 218 subtracts the random envelope phase φr from the above expression, which results in the coherent optical signal 218S having a phase that can be represented as φi+φk+φp, which is presented to the detection unit 220.

The detection unit 220 attempts to detect the phase of signal 218S using a local oscillator whose laser source may or may not be offset in phase from the laser source used by the laser diode. As such, the output of the detection unit 220, denoted 220S, is a voltage signal (analog or digital) that represents a total detected phase shift of:

$$\varphi k + \varphi p + \varphi LO \pm \delta\varphi, \qquad \text{Eq. (1)}$$

where φLO is the relative phase between the laser source of the laser diode of the device 210 and the local oscillator of the detection unit 220, and δφ is the measurement uncertainty, i.e., the angular uncertainty in the measured phase obtained by the measurement act itself.

It should be appreciated that if the round-trip phase shift φp and φLO can be determined and if δφ is small, it is possible for Bob to detect the key phase φk with some accuracy. For example, the contribution of the round-trip phase shift φp can be estimated from measurements of the key distribution channel 130. Moreover, if the same laser source is used for the laser diode of the device 210 and for the local oscillator of the detection unit 220, φLO should be close to zero.

Additionally, Bob can perform a calibration procedure to calibrate the round-trip phase shift φp (along the optical path) and the relative phase shift φLO: φp+φLO because they are relatively stable (i.e., constant) in comparison with the laser signal baud rate. During this calibration procedure, Alice can either stand by or apply a change of phase in accordance with a pre-agreed pattern. If Alice stands by, then Bob's detected phase of each 218S just comes out to the round-trip path and the local oscillator plus the measurement error: φp+φLO±δφ. Therefore, the average phase shift $$\overline{\varphi p + \varphi LO}$$

and standard measurement error δφ can be easily obtained from this calibration procedure. In some embodiments, Alice can also participate in the calibration procedure with agreed training patterns. The calibration procedure can be repeated a number of times to achieve greater accuracy.

This calibration procedure can also be considered as path authentication by measuring the round-trip delay time and verifying if the average delay time is within a configured acceptable level.

The calibration procedure can be periodically performed during the key distribution process, or the key distribution process can also be treated as a dynamic calibration process to update average phase shift $$\overline{\varphi p + \varphi LO}$$

which can also be used to rotate Bob's constellation diagram.

The calibration procedure can be also used to determine what the maximum number of key phases is possible for the key distribution such that Bob is still capable to clearly identify them in his constellation diagram (i.e., a bit error rate (BER) below a certain threshold). The higher number of key phases, the higher key bit rate (baud rate), and the more difficulty an attacker will have (see later on in this document).

The calibration procedure can also be used to test what the minimum power at Bob's transmission laser diode should be for Bob to still be able to successfully extract the secret key from Alice with an acceptable bit error rate (BER), e.g., below a certain threshold.

Finally, the measurement error δφ, although it cannot be reduced to zero, can be minimized to within a few degrees using high quality detection equipment and sufficiently strong optical pulses.

Once the key phase φk is known, Bob's processing unit 222 converts this value into one or more bits corresponding to bits of Alice's secret key, and the secret key is provided to Bob's data processing system 114 for use in encrypting a message for transmission to Alice across the data channel 140.

As such, the digital communication method of the present disclosure can be summarized by the following sub-steps:

Bob generates a coherent optical signal 210S and modulates it with the random envelope phase φr, known to him and not to Alice, and transmits the modulated coherent optical signal (the envelope 216S) over the key distribution channel 130 to Alice;

Alice further modulates the envelope 216S with a key phase φk, based on a secret key and a selected modulation scheme, to create a cipher envelope 252S, and sends the cipher envelope 252S towards Bob;

Bob demodulates a received version of the cipher envelope 252S by removing the random envelope phase φr (known to Bob) and then measures the phase of the resulting demodulated coherent optical signal 218S with the coherent detector 220 to extract, to within a certain margin of error, the key phase φk, from which Alice's secret key can be decoded.

Figure 3:
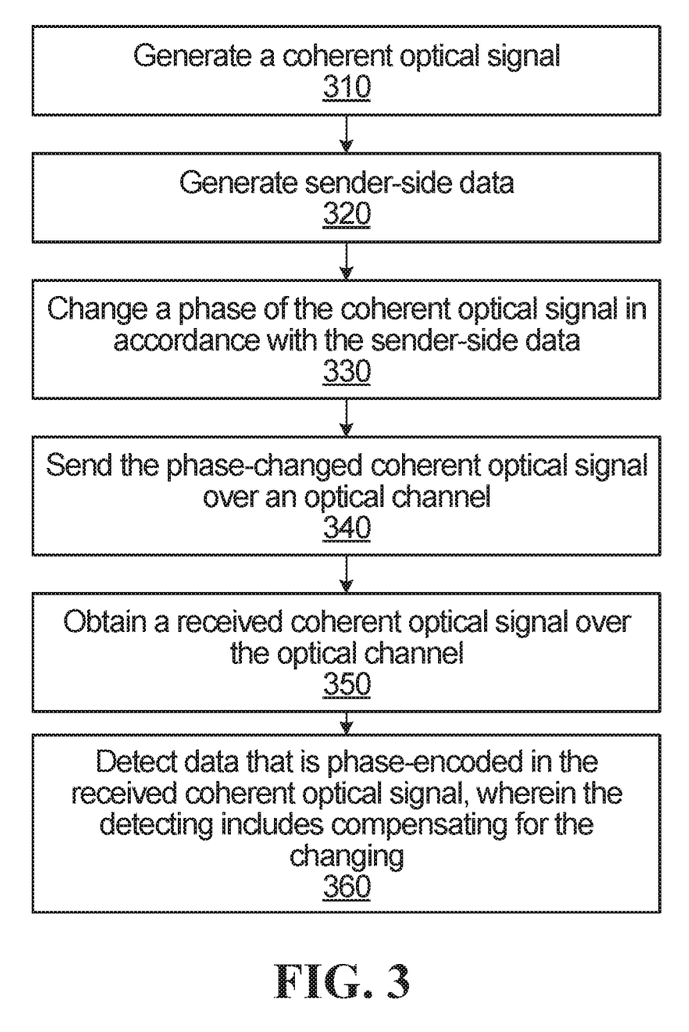
FIG. 3 is a flowchart showing steps in an example key distribution process carried out by the sender, referred to as Bob.

Generally speaking, therefore, the components of the first apparatus (Bob) can be said to implement a method that is now described with reference to the flowchart in FIG. 3, whereby the method comprises generating a coherent optical signal by, e.g., a laser diode (step 310); generating sender-side data, such as a random number (step 320); changing a phase of the coherent optical signal in accordance with the sender-side data using, e.g., by using a phase modulator to add the random envelope phase φr (step 330); sending the phase-changed coherent optical signal (or "envelope") over an optical channel (step 340); obtaining a received coherent optical signal ("cipher envelope") over the optical channel (step 350); and detecting data that is phase-encoded in the cipher envelope, wherein the detecting includes compensating for said changing, e.g., by removing the random envelope phase (step 360). Step 360 may involve (i) changing a phase of the cipher envelope in accordance with the sender-side data, thereby to produce a phase-changed received coherent optical signal, and (ii) processing the phase-changed received coherent optical signal with a coherent detector at the oscillation frequency, to obtain a received/detected phase, which bears a relationship to the key phase φk added by Alice and which conveys bits of Alice's secret key.

Figure 4:
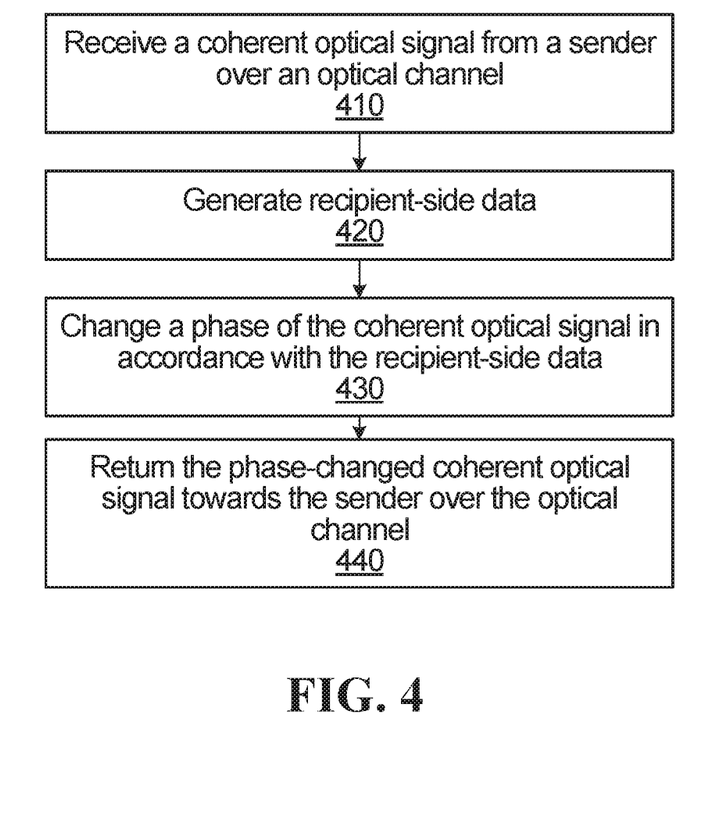
FIG. 4 is a flowchart showing steps in an example key distribution process carried out by the recipient, referred to as Alice.

In addition, the components of Alice's second apparatus (Alice) can be said to implement a method that is now described with reference to the flowchart in FIG. 4, whereby the method comprises receiving a coherent optical signal ("envelope') from a sender over an optical channel (step 410); generating recipient-side data, e.g., using a random number generator (step 420); changing a phase of the envelope in accordance with the recipient-side data, e.g., using a key modulator to add the key phase φk (step 430); and returning the phase-changed envelope (or "cipher envelope") towards the sender over the optical channel (step 440). The coherent optical signal received at step 410 has the random envelope phase φr added to it by Bob, but this is unbeknownst to Alice.

Thus, it has been demonstrated that addition of the random envelope phase φr by Bob may provide a high-security system, as this quantity is unknown to Alice (or to a would-be attacker). As such, the number of random phases (e.g., 512, 1024, or more, or less, or any number in between), the quality of the sender-side random number generator and the rate at which the random envelope phase φr is changed are all factors that can reduce the likelihood of the attacker guessing the random envelope phase φr contributed by Bob, which consequently makes it difficult for the attacker to guess the key phase φk and therefore Alice's secret key.

Those skilled in the art will appreciate that the digital communication method of the present disclosure supports a variety of currently used phase modulation techniques, including:

Quadrature Phase-Shift Keying QPSK

In this case, each Glauber state of the envelope or cipher envelope represents 2 bits of information. The envelope can be considered as a quantum system or qudit with 4 states.

Phase-Shift Keying PSK

PSK modulates phases only to signals such as 4-PSK with 4 modulation phases equivalent to QPSK, 8-PSK with 8 modulations phases, 16-PSK with 16 modulation phases.

Differential Phase-Shift Keying DPSK

DPSK may be helpful to avoid effects from communication channels. The encoding is based on the phase difference between the signal pulse and a reference pulse which is usually the direct previous pulse. DPSK can also be extended beyond the direct previous pulse to cover a pulse that is further back in time and/or more than one previous pulse.

The use of DPSK merits further discussion. In practice, the instantaneous value of the round-trip phase shift φp is difficult to measure and may change based on environmental conditions such as temperature. Also, the same laser source may or may not be used for the laser diode and the local oscillator, which could mean that φLO is unknown. However, although the instantaneous values of these quantities may be difficult to measure or estimate, they are relatively stable from one laser pulse to another, i.e., these phase components vary slowly from one pulse to another in comparison with the baud rate of the laser pulses. It may therefore be possible to mitigate φp and φLO (which can be referred to as a base phase component) by using a differential modulation scheme such as DPSK.

In particular, consider that Alice's key modulator 252, rather than adding the phase key φk to the phase of a received pulse i, encodes the phase key φk into the difference of a phase shift φ$k_i$ that is added to received pulse i and a previous phase shift φ$k_{i-1}$ that is added to received pulse i−1, i.e., φ$k_i$=φk+φ$k_{i-1}$. Thus, upon eventual detection of pulse i, the output of Bob's detection unit 210 will measure a phase φ$k_i$+φp+φLO±δφ. This is done for the various pulses in the received version of the differentially phase-encoded cipher envelope 252S, and Bob then subtracts the detected phases of consecutive pulses from each other, which gives:

$$\varphi[\text{pulse } i] - \varphi[\text{pulse } i-1] =$$
$$(\varphi k_i + \varphi p + \varphi LO \pm \delta\varphi) - (\varphi k_{i-1} + \varphi p + \varphi LO \pm \delta\varphi) =$$
$$\varphi k_i - \varphi k_{i-1} \pm 2\delta\varphi = \varphi k \pm 2\delta\varphi.$$

As such, it is apparent that Bob is able to recover the phase key φk encoded by Alice with very little uncertainty, which boils down to twice the measurement uncertainty, or ±2δφ. If the aforementioned calibration procedure is performed before the key distribution process, the measurement uncertainty is reduced to ±δφ instead of ±2δφ. This shows that DPSK makes key phase extraction independent from impacts of the light path and the local oscillator.

It is noted that Bob's phase modulator 218, which removes the random envelope phase φr from the version of the cipher envelope 252S sent by Alice and received by Bob, simply carries out a quantum operation to shift the phase of the received cipher envelope, without measurement uncertainty. The only uncertainty from Bob's point of view (using DPSK) is ±2δφ when measuring the phase at the detection unit 210. Moreover, the measurement uncertainty can be further reduced through application of the calibration procedure, as well as constellation design.

Security of the digital communication method of the present disclosure can be further enhanced by changing the key phase based on a reference phase table in accordance with a sequencing algorithm agreed by both Bob and Alice. The sequencing algorithm may be performed by the processing units 222, 256. The reference phase table can be generated by Alice (e.g., by processing unit 256) and Bob (e.g., by processing unit 222) at the beginning of the digital communication method during an initialization procedure, and then updated periodically. The result of using the reference phase table is to force greater uncertainty upon the attacker and/or to allow modulation with fewer constellation points yet still remaining secure.

Figure 6:
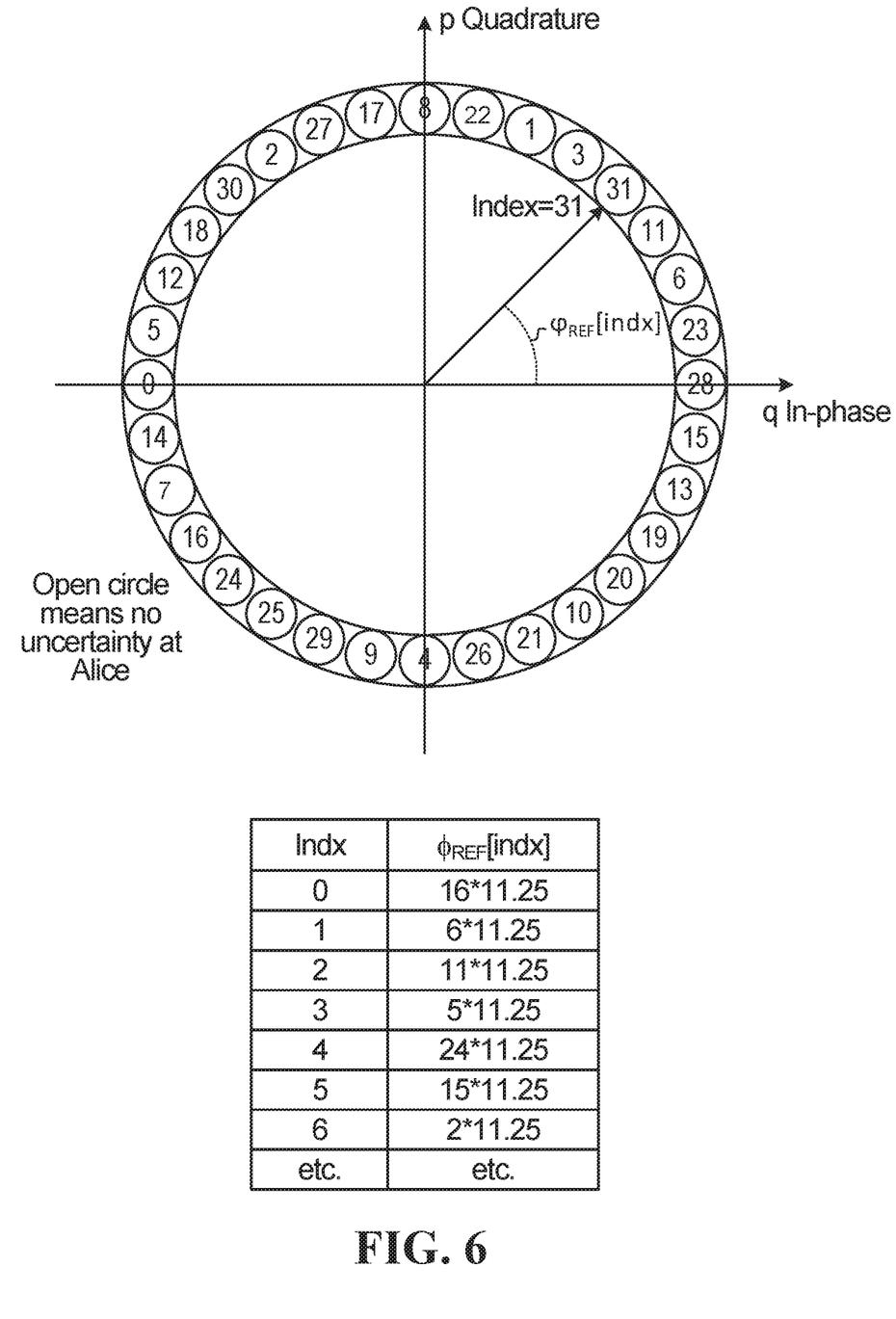
FIG. 6 is a conceptual phase diagram illustrating how a reference phase table maps to phases of a modulation scheme, in accordance with a non-limiting embodiment.

Specifically, reference is made to FIG. 6, which shows a reference phase table 600 having an indexed set of N=32 reference phases in 11.25-degree increments. The reference phase table can be represented graphically by the circle on the top of FIG. 6, which shows a reference phase φ$_{REF}$[n] for each value of n from 0 to 31. For example, φ$_{REF}$[23]=11.25 degrees, φ$_{REF}$[6]=22.5 degrees, and so on. Then, once Alice's processing unit 256 maps the log$_2$(N)=5 bits of the secret key into a desired key phase φk (e.g., using any mapping of choice, including multiplying the decimal value of the 5 bits by 11.25 degrees), Alice's processing unit 256 produces a modified key phase φB as follows:

$$\varphi B = \varphi k + \varphi_{REF}[\text{indx}],$$

where indx is the current value of an index, which may start at 0 and be incremented thereafter with each pulse (modulo N=32 in this example), or changed dynamically in any other way. Thus, instead of encoding the key phase φk into the difference between a phase shift φ$k_i$ and a phase shift φ$k_{i-1}$ applied to two consecutive pulses i and i−1, Alice's key modulator encodes the modified key phase φB, that is the key phase φk based on the reference phase shift φ$_{REF}$[indx].

At Bob's end, the detection unit detects the modified key phase φB±δφ from adjacent pulses, from which the original key phase φk is determined by the processing unit 222 using the reference phase table: φk=φB−φ$_{REF}$[indx]±δφ, and from which the log$_2$(N) bits of the secret key can be decoded and sent to Bob's data processing system 114.

If Bob performs the calibration procedure described above, then he can rotate his constellation diagram corresponding to the reference phase table back to Alice's reference phase table, with an average calibration of the path and LO phase shift $$\overline{\varphi p + \varphi LO},$$

or he can calibrate each reference phase based on $$\overline{\varphi p + \varphi LO}$$

to eliminate the measurement uncertainty of each reference phase. By doing this, Bob is able to maintain his measurement uncertainty of key phases at $\delta\varphi$ rather than $2\delta\varphi$.

To add an even greater level of security, the reference phase table may be updated from time to time in accordance with an algorithm that is known to, and followed synchronously by, Bob's and Alice's processing units 220,256, respectively.

It should be appreciated that the aforementioned measurement error$\pm 2\delta\varphi$ can be reduced through various techniques in addition to the calibration procedure described above. By way of specific non-limiting example, consider that during a second calibration procedure, Alice sends Bob the jth phase in the reference phase table, denoted $\varphi_{REF}[j]$, and that Bob is made aware of this. Now consider that the phase measured by Bob's detection unit 210 is $\varphi_C[j]$. If $\varphi_C[j]$ corresponds exactly to one of the reference phases, then this means that the total measurement error is an integer multiple of the smallest phase increment (in the above non-limiting embodiment, this increment was 11.25 degrees). The differential nature of DPSK implies that no further calibration is needed.

However, if $\varphi_C[j]$ does not correspond exactly to one of the reference phases, and is somewhere between two reference phases, then calibration is required. Specifically, suppose that the nearest reference phase is $\varphi_{NR}$. This means that there is an effective phase rotation error of $\varphi_{er}[j]=\varphi_C[j]-\varphi_{NR}$. The effective phase rotation error can be calculated for all N reference phases and averaged:

$$\varphi_{avg} = \frac{1}{N}\sum_j \varphi_{er}[i].$$

Each measurement can then be calibrated by this amount. If N is large enough, this calibration can effectively eliminate the measurement error for each phase, because there will always be a reference phase close enough to the measured phase.

It should be noted that the above second calibration procedure is not available to a would-be attacker, which means that the attacker will eternally remain at a disadvantage. In fact, the second calibration procedure can be used to test the extreme situation by increasing the number of bits represented by phase modulation, where Bob can still correctly decode the key, modulated by Alice.

Indeed, the digital communication method of the present disclosure may be resistant to a variety of attacks, as will now be described.

Man-in-the-Middle (MITM) Attack

Physical verification of an optical pathway can be used for authenticating the key distribution channel 130. For example, Bob can authenticate Alice with optical fiber analysis tools, such as an optical time-domain reflectometer OTDR. Physical testing and verification can help check the optical channel's integrity. Within the context of the digital communication method of the present disclosure, the integrity of the key distribution channel 130 can be dynamically verified between the communication peers (e.g., Bob's and Alice's processing entities 222, 256) by computing, measuring and monitoring the signal time delay during the roundtrip based on the known optical fiber length. The detected time delay may vary due to environmental fluctuations, but should remain within a predetermined acceptable variation relative to a nominal level. If the detected delay time is beyond an acceptable level, then this is a clue that channel integrity has been compromised. As this can be due to an attacker having inserted themselves in the key distribution channel between Bob and Alice, action should be taken to identify the cause.

Intercept-Resend Attack

An attacker can behave like Alice to completely intercept the envelopes circulating between Bob and Alice and gain their intensities and phases, then regenerate them and send back to Bob those that Bob is destined to receive. However, Bob can easily realize that such an attack is taking place based on a sudden increase in the bit error rate (BER) of the received key due to the no-cloning theorem of an unknown Glauber state. To this end, some redundancy/error correction can be built into the way in which Alice communicates the secret key to Bob. Such an attack may also be caught by the detected time delay for the roundtrip if the intercept-resending process takes longer than a certain threshold variation relative to a nominal level (the threshold being set based on expected variations due to the environment).

Tapping Attack

In a tapping attack, the attacker diverts a small percentage of the optical signal traveling on the key distribution channel in an attempt to avoid a direct impact on the intensities of the envelopes being communicated. Bob can monitor the receiving intensities and track to see if variations are within an acceptable level. If not, this signal is a tapping attack and may result in Bob taking an action to identify the cause. However, if Bob does not detect an impermissible drop in intensity, this does not mean that a tapping attack is not under way; there could still be "invisible weak tapping" going on.

The invisible weak tapping scenario warrants further consideration. In this case, with reference to FIG. 7, the attacker taps the key distribution channel 130 at two points T1 and T2 and performs measurements to try and remove the random envelope phase $\varphi r$ added by Bob. T1 should be close to Bob and T2 should be close to Alice to minimize the impact to the phase of the envelopes traveling on the key distribution channel. But practically speaking, it more is likely that an attacker will locate both T1 and T2 close to Alice. At T1, the tapping is used to monitor the received version of incoming signal 216S and at T2, the tapping monitors the outgoing signal 252S.

Figure 7:
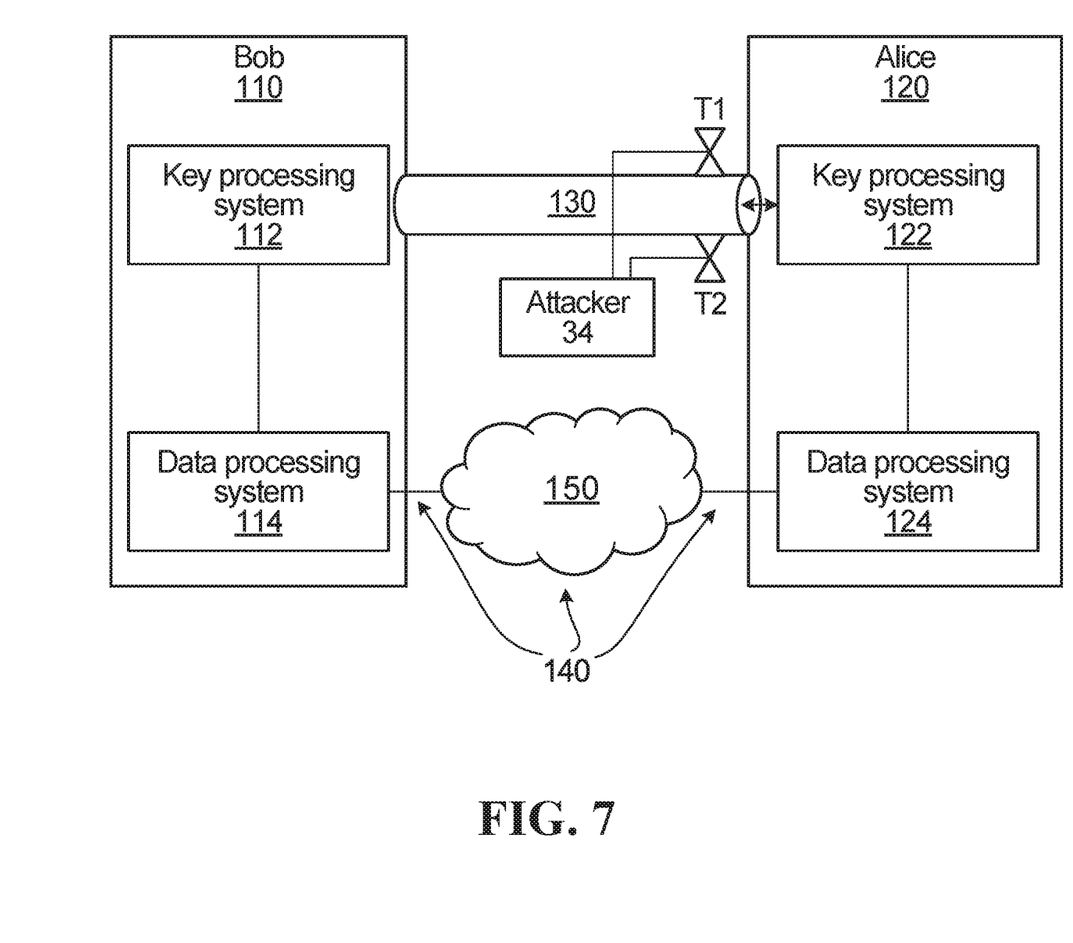
FIG. 7 is a block diagram illustrating a tapping attack on the digital communication system of FIGS. 1 and 2.

At T1, the attacker measures the phase $\varphi'T1=\varphi r+\varphi pT1+\varphi LO\_T1\pm\delta\varphi$, where $\varphi pT1$ is the phase shift introduced by the key distribution channel 130 from Bob to point T1, $\varphi LO\_T1$ is the phase of the attacker's local oscillator and $\delta\varphi$ is the measurement error from the attacker's detector. At T2, the attacker measures the phase $\varphi'T2=\varphi k+\varphi r+\varphi pT2+\varphi LO\_T2\pm\delta\varphi$, where $\varphi pT2$ is the phase shift introduced by the key distribution channel 130 from Bob to point T2, and $\varphi LO\_T2$ is the phase of the attacker's local oscillator. At this point, φ'T1 is subtracted from φ'T2, which produces the following at the attacker's detection unit:

output of detection unit=φ'T2−φ'T1=φk+φp+ φLO±2δφ  Eq. (2)

This shows that the random envelope phase φr added by Bob has disappeared, but with the cost that three new terms appear:

φp from the path between T1 and T2,
φLO from the difference in the attacker's two local oscillators, and
measurement error totalling 2δφ from the attacker's measuring equipment. (It will be shown later on that this error may in fact be higher.)

In a non-differential phase modulation scheme, the attacker may attempt to remove φp by estimating and then compensating for the time delay from point T1 to point T2, but this may be difficult to do in practice, and the value may fluctuate significantly as environmental conditions change. The attacker may remove φLO if the attacker uses the same local oscillator for both taps, however, this may not be possible if T1 and T2 are far apart. Finally, comparing Eq. (2) with Eq. (1) above, the attacker has an inevitable disadvantage: additional measurement uncertainty arising from having taken two measurements instead of one (±2δφ instead of ±δφ).

Assuming that the attacker's detection unit introduces an overall uncertainty of 5 degrees in a phase measurement as an example, the output of the attacker's detection unit will be no better than ±2δφ=±10 degrees from Eq. (2). This can be used as a basic guideline to select a modulation scheme for Alice and Bob. For example, a suitable selection of phase modulation scheme may have a phase spacing of less than approx. 20 degrees, that is, more than approx. 16 phases. This renders the attacker unable to distinguish one key phase from another due to the physical limitations arising from the detection equipment itself.

In a differential phase modulation scheme, φp and φLO can be removed in a manner similar to what was described above as being performed by Bob. If this is done, the output of the attacker's detection unit now becomes:

output of detection unit=φk±4δφ,  Eq. (3)

which means that DPSK doubles the uncertainty to the attacker's measurements due to a subtraction between key phase and reference phase. As such, for differential modulation, where the phase error is ±4δφ, a DPSK scheme with 16 phases should be adequate, and may be brought down to a lesser number of phases (e.g., 8).

Those skilled in the art will appreciate that there an increase in the measurement error introduced by the attacker not only because of the greater number of measurements required (as discussed above), but also because of the "number-phase uncertainty principle", which is described herein below but essentially states that the lower the number of tapped photons that are measured, the greater the uncertainty in their phase (and vice versa). In particular, the relationship ΔnΔφ≥½ is observed, where Δn is the square root of the number of photons being measured (or tapped, from the point of view of an attacker). For example, in the case where the average number of tapped photons per coherent laser pulse is 10, one has Δn=√10≈3 photons, and Δφ≈0.016 rad=10°. That means that the measurement on a pulse containing about 10 photons comes with an uncertainty of about 10 degrees in its measured phase.

It is important to bear in mind that improvements in detection equipment accuracy do not eliminate the contribution due to the number-phase uncertainty principle for invisible weak tapping. Thus, even if a commercially balanced 2×4 hybrid 90° coupler is used, which comes with an uncertainty of δφ=±5 degrees (and sometimes even as little as ±3 degrees under certain conditions), this is of no value to an attacker who tries to remain invisible by tapping a small number of photons, because Δφ may be on the order to 10 degrees or more. As such, there is a lower bound on the uncertainty that will be inherent to the act of diverting a small number of photons, and this uncertainty grows further as the number of tapped photons decreases. Ultimately, this places the attacker at a disadvantage to Bob's use of the present digital communication method, with the lower bound on Bob's measurement error being set by the quality of the equipment used, whereas the lower bound on the attacker's measurement error will be set by the higher of (i) the quality of the equipment used and (ii) the number-phase uncertainty principle for weak tapping.

In conclusion, the digital communication methods of the present disclosure provide added security due to (i) randomization of the random envelope phase φr at Bob; (ii) multiple bit phase modulation of the key phase φk at Alice; and (iii) the number-phase uncertainty principle; (iv) dynamic reference DPSK.

More particularly, it is noted that the "quantum limit" sets the lower bound on the signal power needed for coherent detection with an acceptable bit error rate (BER). It practice, it has been found that an attacker needs to detect at least 10 photons per bit to apply coherent detection with an acceptable BER. This value is obtained with quantum shot noise only, without consideration of thermal noise and amplification noise, etc., which have the effect of raising the lower bound.

Considering now that for 10 photons, the number-phase uncertainty principle provides a phase error of Δφ=10°, this limit guides how to choose the phase modulation scheme. That is to say, if one selects a phase modulation scheme for which adjacent phases are separated by 10 degrees or less, this would make it impossible for the attacker to detect the correct phase using weak (undetectable) tapping. Yet in the case of Bob, he has access to more photons and therefore the phase measurement error can be reduced to below 10°, to 5° or even less, depending on the quantum noise and the quality of equipment. Thus, a modulation scheme that provides between 3° and 10° between adjacent constellation points would be usable by Bob and impenetrable by a weak tapping attack. This amounts to a number of phases between 36 and 120, although 32 or even 16 phases would seriously hamper an attacker in practice.

When DPSK (or referenced DPSK—i.e., DPSK with a reference phase table) is used as above, the attacker's error doubles (or worse), making 5-bit phase modulation (i.e., 32 phases) impenetrable, and baking 16-phase or even 8-phase modulation schemes sufficiently resistant against an invisible weak tapping attack.

Therefore, a method has been provided, which includes phase-modulating a coherent optical with a first phase component, thereby to produce a second coherent optical signal; releasing the second optical signal onto an optical channel; phase-modulating a version of the second optical signal received over the optical channel to remove the first phase component; and detecting a second phase component present in the received version of the second optical signal and absent from the second optical signal that was released onto the optical channel. A key may be decoded from successive detecting of the second phase component, whereas the first phase component is selected from a constellation. Adjacent points in this constellation have less angular separation than the angular uncertainty in tapping 10 photons (approx. 10 degrees according to the number-phase uncertainty principle). A suitable constellation may have points at 16 or more different phases.

Amplitude Modulation

One way to further increase security and/or the data rate for transmission of the key is for Alice to encode the key not only in the phase of the envelope, but also in its amplitude.

In particular, Alice's processing entity 256 converts the bits of the secret key into the key phase and into a key amplitude. A key-modulation mapping table may be used for this purpose. The key modulator 252 performs phase and amplitude modulation to produce a cipher envelope, with a key phase φk and an amplitude |αr'| from the key-modulation mapping table. The cipher envelope 252S is then returned to Bob, where Bob derandomizes the cipher envelope with phase modulator 218 to remove the random phase φr that had previously been added by Bob. The detection unit then extracts both the key phase φk (as discussed above) and the amplitude |αr'| that were modulated by Alice.

In this non-limiting variant, a suitable modulation scheme may be Amplitude phase-shift keying APSK, which modulates both phase and amplitude to a single pulse. APSK can work with a few modes such as 8-APSK for 3-bit modulation, 16-APSK for 4-bit modulation, 32-APSK for 5-bit modulation, 64-APSK for 6-bit modulation, etc.

Number-Phase Uncertainty Principle

In quantum mechanics, coherent states are the specific quantum states of a quantum harmonic oscillator. They were first introduced to the quantum theory of light by R. J. Glauber in 1963 [9], and later are referred to as Glauber states. Glauber states are important in today's highspeed optical communications, especially in long-haul, metro and wireless backhaul. A Glauber state is usually denoted by Dirac bra-ket notation with α to be $|\alpha\rangle$. It is an eigenstate of the annihilation operator:

$$|\alpha\rangle = \alpha |\alpha\rangle \quad (A1)$$

and the annihilation operator in Eq. (A1) is not Hermitian, so it has a complex eigenvalue $\alpha = |\alpha| e^{i\phi}$ with $|\alpha|$ as its amplitude and φ as its phase. A quantum harmonic oscillator has two sets of conjugate variables: photon number n with phase φ and coordinate or in-phase q with momentum or quadrature p. Their uncertainty relationships are $$\Delta p \Delta q \geq 1 \quad (A2)$$

$$\Delta n \Delta \phi \geq \frac{1}{2} \quad (A3)$$

The above uncertainty relationships in Eqs. (A2) and (A3) play a role in coherent detections. Beck, Smithey and Raymer had experimentally verified the number-phase uncertainty principle in Eq. (A3) (see M. Beck, D. T. Smithey and M. G. Raymer, "Measurement of number-phase uncertainty relations of optical fields", *Phys. Rev. A* 48, 3159, Published 1 Oct. 1993). Their experiment demonstrates that the number-phase uncertainty maximizes at around single photon coherent states where $\Delta n \Delta \phi \approx \frac{3}{4}$ and then tends to ½ as the average photon number increases beyond 4 photons per pulse. From the number-phase uncertainty in Eq. (A3), we can see that a Fock state, precisely described by an eigenstate $|n\rangle$ with an eigenvalue n, has $\Delta n = 0$ so its phase $\phi \in [0, 2\pi]$ is totally uncertain. However, a Glauber state is a superposition of Fock states with a probability amplitude associated with the Poissonian number distribution: it does not have a precise number of photons per state. A Glauber state describing a laser beam can be characterized as having an indefinite number of photons but a precise defined phase, in contrast to a Fock state or pure quantum state with a fixed photon number but a random phase.

Figure 5:
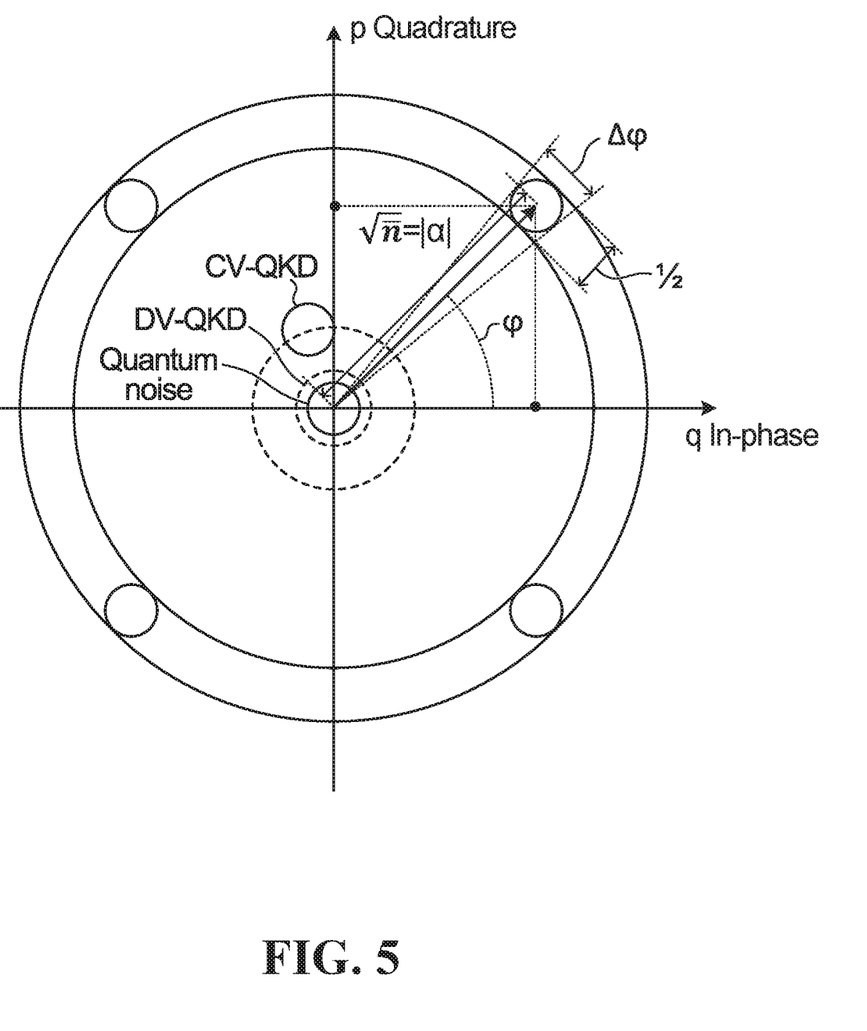
FIG. 5 is a conceptual phase diagram illustrating a Glauber state.

A Glauber state in phase space is illustrated in FIG. 5. Inside the figure, the small circles indicate the uncertainty of Glauber states. This uncertainty circle is the same for different Glauber states from ground state where $|\alpha = 0 e^{i\phi}\rangle$ is the quantum noise with an energy $E0 = \frac{1}{2} \hbar \omega$ ($\hbar$ is the Planck constant and ω is the angular frequency of the oscillator), to any excited state with large amplitude |α|. When the amplitude |α| is well less than 1 (this is where Discrete Value Quantum Key Distribution (DV-QUD) usually works) the quantum signals are within or at the quantum noise level. In this area, the quantum noise plays a critical role in the measurement of qubits, which is the major factor of lower key rate and relative short distance for key distributions. At the other extreme, at very large |α|, the quantum harmonic oscillator tends to resemble a classical harmonic oscillator in which the quantum noise become less critical.

Also, there a known quantum limit for coherent detection, which is 10 photons per bit under consideration of quantum noise only. Thermal noise, as well as amplifier noise, would push this limit higher. This disclosure takes the quantum limit as an optimal consideration through signal power budgeting around Alice. Specifically, based on the number-phase uncertainty principle, a Glauber state with 10 photons would be associated with approximately 10 degrees of uncertainty in phase. As such, 5-bit phase encoding (32 phases) would dramatically restrict an attacker's capability under the quantum limit. This means that even with the most invisible coherent detector, and no thermal noise, an attacker cannot distinguish a 5-bit phase encoding, because the phase uncertainty is just too high, and the attacker is just as well off guessing the outcome. If, on top of that, the proposed referenced DPSK scheme described herein is used, this adds a further degree of uncertainty to the attacker.

Depending on the distance between Bob and Alice, this power budgeting may include suitable phase-sensitive amplification on the optical path 130, especially from Alice on the return path to Bob, to maintain an acceptable SNR and/or BER at Bob's detection unit 220. To this end, a technique based on parametric mixing between waves medium may be used, for example.

Thus, a digital communication method over an optical channel has been described, whereby Bob modulates a coherent optical signal with a random envelope phase φr, known to him and not to Alice, and transmits the modulated coherent optical signal (envelope) over the optical channel to Alice. Alice further modulates the envelope with a key phase φk, based on a secret key and a selected modulation scheme, to create a cipher envelope, and sends the cipher envelope towards Bob along the optical channel. Bob then demodulates a received version of the cipher envelope by removing the random envelope phase φr (known to Bob) and then measures the phase of the resulting demodulated coherent optical signal with the coherent detector to extract, to within a certain margin of error, the key phase φk, from which Alice's secret key can be decoded. Bob then uses the secret key for encrypting messages sent to Alice over any digital network.

Figure 8:
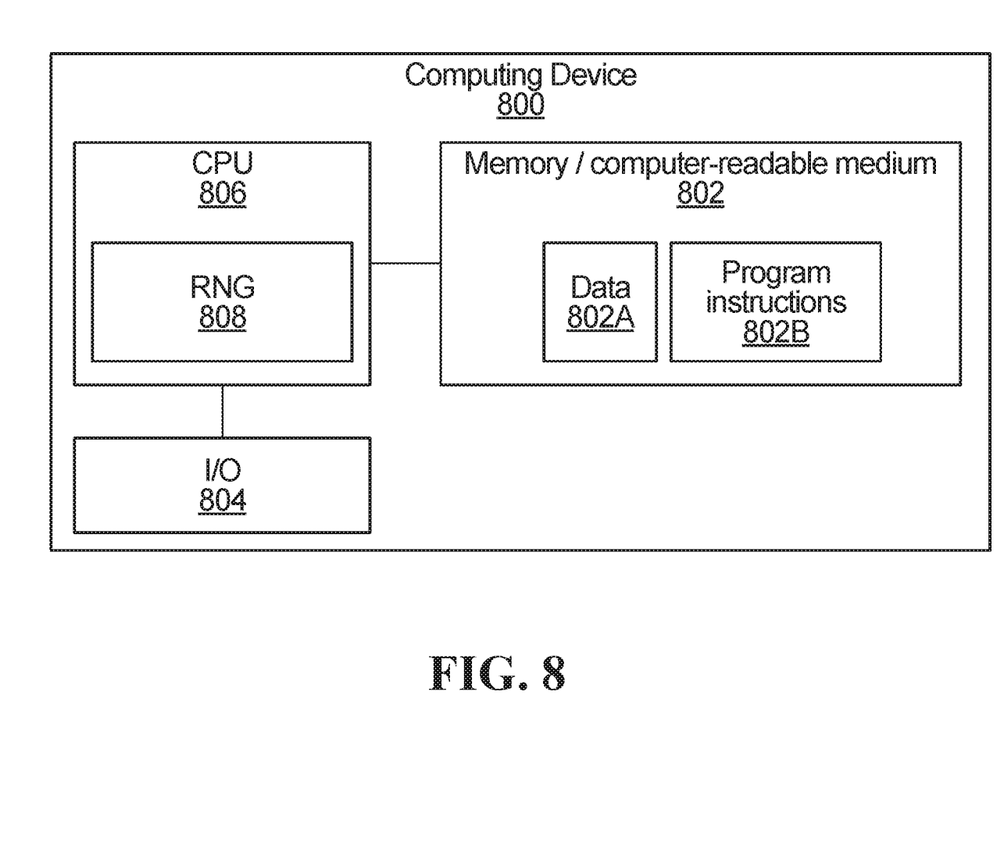
FIG. 8 is a block diagram illustrating components of a computing device that may be used in various elements of the digital communication system of FIGS. 1 and 2.

Certain components of the aforementioned systems may be implemented as hardware, firmware, software, or a combination thereof. With reference to FIG. 8, there is provided a computing device 800 which includes a processor 806 (e.g., microprocessor, CPU) operatively coupled to a memory 802 (computer-readable medium) and an interface 804 (input/output interface). The memory 802 comprises data storage 802A and a program storage unit 802B. The program storage unit 802B includes an application program and operating system code stored in non-transitory form (e.g., in non-volatile memory) that are read and executed by the processor 806. The application program in the program storage unit, as well as operating system code, may be read and executed by the processor 806, thereby to carry out the various methods and functions encoded in the application program. The data storage 802A stores data in non-transitory form (e.g., in volatile memory) that is used by the application program. The processor 806 may also implement a random or pseudo-random number generator 808, or this can be done in software.

In an example, the computing device 800 may implement Bob's data generator 214 and may be operatively coupled to the phase modulators 216, 218 and to the detection unit. One of the processes that may be encoded in the computer-readable instructions and carried out by the processor is a sender-side process, which may comprise generating sender-side data, providing the sender-side data to a phase modulator for changing a phase of a coherent optical signal in accordance with the sender-side data, and detecting data that is phase-encoded in the received coherent optical signal, wherein the detecting includes compensating for such changing.

In another example, the computing device 800 may implement Alice's key generator 252.

The examples and language recited herein are intended for pedagogical purposes to aid the reader in understanding the principles of the disclosed embodiments and concepts, and are to be construed as being without limitation to such specifically recited examples and language. Moreover, statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that certain adaptations and modifications of the described embodiments can be made. Therefore, the above discussed embodiments are to be considered illustrative and not restrictive. Also, it should be appreciated that additional elements that may be needed for operation of certain embodiments of the present disclosure have not been described or illustrated as they are assumed to be within the purview of the person of ordinary skill in the art. Moreover, any feature of any embodiment discussed herein may be combined with any feature of any other embodiment discussed herein in some examples of implementation. Moreover, certain embodiments of the present disclosure may be free of, may lack and/or may function without any element that is not specifically disclosed herein.

What is claimed is:

1. A method, comprising:
   generating a coherent optical signal;
   generating sender-side data;
   changing a phase of the coherent optical signal in accordance with the sender-side data;
   sending the phase-changed coherent optical signal towards a recipient over an optical channel;
   obtaining a received coherent optical signal from the recipient over the optical channel; and
   detecting data that is phase-encoded in the received coherent optical signal, wherein the detecting includes:
   compensating for said changing by changing a phase of the received coherent optical signal in accordance with the sender-side data, thereby to produce a phase-changed received coherent optical signal; and
   obtaining decoded data based on changes in values of a detected phase of the phase-changed received coherent optical signal, the decoded data comprising a combination of a digital key and a phase reference added by the recipient.

2. The method defined in claim 1, wherein generating the coherent optical signal is carried out using an oscillator that oscillates coherently at an oscillation frequency.

3. The method defined in claim 2, wherein detecting the data comprises processing the phase-changed received coherent optical signal with a coherent detector at said oscillation frequency, to obtain a received phase.

4. The method defined in claim 3, wherein the detecting further comprises demodulating the received phase in accordance with a modulation scheme.

5. The method defined in claim 4, further comprising, before the demodulating, adjusting the received phase to compensate for a base phase component.

6. The method defined in claim 5, wherein the base phase component comprises a phase contribution of the optical channel.

7. The method defined in claim 5, wherein the base phase component comprises a phase difference between oscillators of the component and the coherent detector.

8. The method defined in claim 5, wherein the modulation scheme is associated with a constellation and wherein adjusting the received phase takes into account information gathered during a calibration procedure that precedes the sending.

9. The method defined in claim 1, wherein changing the phase of the coherent optical signal comprises causing the coherent optical signal to undergo a certain phase shift and wherein changing the phase of received coherent optical signal comprises causing the received coherent optical signal to undergo the opposite of the certain phase shift.

10. The method defined in claim 9, wherein causing the coherent optical signal to undergo the certain phase shift comprises using a first phase modulator driven by a voltage that depends on the sender-side data and wherein causing the received coherent optical signal to undergo the opposite of the certain phase shift comprises using a second phase modulator driven by a voltage that depends on the same sender-side data.

11. The method defined in claim 10, further comprising changing the sender-side data over time.

12. The method defined in claim 11, wherein the sender-side data is a data stream output by a random number generator or a pseudo random number generator.

13. The method defined in claim 1, wherein detecting the data comprises decoding the data from values of a detected phase of the phase-changed received coherent optical signal.

14. The method defined in claim 1, further comprising using the digital key to encode a message subsequently sent to the recipient along a second channel different from the optical channel.

15. The method defined in claim 1, further comprising removing the phase reference to obtain the digital key.

16. The method defined in claim 15, further comprising determining the phase reference before the removing.

17. The method defined in claim 16, wherein determining the phase reference comprises consulting a reference phase table at a particular index.

18. The method defined in claim 17, wherein the particular index corresponds to a previous digital key previously decoded from a previous received coherent optical signal.

19. The method defined in claim 17, further comprising exchanging the reference phase table with the recipient as part of an initialization procedure that precedes the sending.

20. The method defined in claim 19, further comprising carrying out a calibration procedure to rotate a constellation corresponding to the reference table based on detecting phases of signals sent by the recipient at known phases.

21. An apparatus, comprising:
    an optical device configured for generating a coherent optical signal;
    a data generator configured for generating sender-side data;
    a phase modulator operatively coupled to the optical device and the data generator, configured for changing a phase of the coherent optical signal in accordance with the sender-side data;
    an interface operatively coupled for the phase modulator, configured for sending the phase-changed coherent optical signal to a recipient over an optical channel and for obtaining a received coherent optical signal from the recipient over the optical channel; and
    demodulation and detection hardware operatively coupled to the interface and to the data generator, configured for detecting data that is phase-encoded in the received coherent optical signal, wherein the detecting includes:
        compensating for said changing by changing a phase of the received coherent optical signal in accordance with the sender-side data, thereby to produce a phase-changed received coherent optical signal; and
        obtaining decoded data based on changes in values of a detected phase of the phase-changed received coherent optical signal, the decoded data comprising a combination of a digital key and a phase reference added by the recipient.

22. The apparatus defined in claim 21, wherein the detecting further comprises consulting a reference phase table at a particular index to determine the phase reference, and removing the phase reference to obtain the digital key, wherein the reference phase table is exchanged with the recipient as part of an initialization procedure that precedes the sending.

* * * * *